United States Patent
Brockhaus et al.

(10) Patent No.: US 7,174,256 B2
(45) Date of Patent: Feb. 6, 2007

(54) MAGNETOINDUCTIVE FLOWMETER AND MEASURING METHOD FOR A MAGNETOINDUCTIVE FLOWMETER

(75) Inventors: Helmut Brockhaus, Dinslaken (DE); Wilhelm Florin, Duisburg (DE)

(73) Assignee: Krohne A.G., Basel (CH)

( * ) Notice: Subject to any disclaimer, the term of this patent is extended or adjusted under 35 U.S.C. 154(b) by 73 days.

(21) Appl. No.: 10/978,496

(22) Filed: Nov. 1, 2004

(65) Prior Publication Data

US 2005/0125168 A1     Jun. 9, 2005

(30) Foreign Application Priority Data

Dec. 8, 2003    (DE)    ............... 103 57 514

(51) Int. Cl.
*G06F 19/00*    (2006.01)
(52) U.S. Cl. .................... 702/38; 73/862.12
(58) Field of Classification Search ............... 702/188, 702/38, 115; 73/862.12, 862.17
See application file for complete search history.

(56) References Cited

U.S. PATENT DOCUMENTS 5,351,554 A * 10/1994 Budmiger ................ 73/861.17
6,584,859 B1    7/2003 Brockhaus et al.
6,973,840 B2 * 12/2005 Cushing ................... 73/861.17

FOREIGN PATENT DOCUMENTS

JP    2001324361 A    11/2001

* cited by examiner

*Primary Examiner*—Edward Raymond
(74) *Attorney, Agent, or Firm*—John F. McKenna; Cesari & McKenna, LLP

(57) ABSTRACT

The magnetoinductive flowmeter measures the flow volume of a medium traveling through a measuring tube, with a magnet that serves to generate a magnetic field permeating the measuring tube that has a magnetic-field component that extends perpendicular to the direction of flow. The flowmeter also includes a first measuring electrode and a second measuring electrode for collecting a voltage induced in the medium, a reference electrode, as well as a preamplifier to which the potentials collected by the two measuring electrodes are fed. A control circuit element is provided for controlling the common-mode input voltage of the preamplifier and/or the potential span of the dynamic range of the preamplifier in such fashion that the said common-mode input voltage of the preamplifier corresponds to approximately half the maximum output voltage of the preamplifier. This concept also permits the use of preamplifiers that operate with a low supply voltage such as 0/5 V. A measuring method is also disclosed.

10 Claims, 2 Drawing Sheets

MAGNETOINDUCTIVE FLOWMETER AND MEASURING METHOD FOR A MAGNETOINDUCTIVE FLOWMETER

This invention relates to a magnetoinductive flowmeter for measuring the flow volume of a medium traveling through a measuring tube, with a magnet that serves to generate a magnetic field permeating the measuring tube including a magnetic-field component that extends perpendicular to the direction of flow, with a first measuring electrode and a second measuring electrode for collecting a voltage induced in the medium, a reference electrode, as well as a preamplifier to which the potentials collected by the two measuring electrodes are fed. The invention further relates to a measuring method for a magnetoinductive flowmeter designed to measure the flow of a medium traveling through a measuring tube, said magnetoinductive flowmeter incorporating a magnet that serves to generate a magnetic field permeating the measuring tube including a magnetic-field component that extends perpendicular to the direction of flow, with a first measuring electrode and a second measuring electrode for collecting a voltage potential induced in the medium, a reference electrode, as well as a preamplifier to which the potentials collected by the two measuring electrodes are fed.

The terms "voltage" and "potential" used above and in the following description refer to "voltage" as a condition in which a substantive potential difference exists between two points. "Potential" refers to the electric potential of a specific point in a predefined potential system, for instance, relative to chassis ground or earth.

BACKGROUND OF THE INVENTION

Magnetoinductive flowmeters and measuring methods for magnetoinductive flowmeters of the type referred to above have been well known for some time and are employed in a wide variety of applications. The underlying principle of a magnetoinductive flowmeter for measuring the flow rate of a medium traveling through a measuring tube goes all the way back to Faraday who as early as 1832 proposed applying the principle of electrodynamic induction in the measurement of flow rates.

Faraday's law of induction postulates that when a flowing medium that contains charge carriers travels through a magnetic field, an electric field intensity is generated in the medium perpendicular to the direction of flow and to the magnetic field. Magnetoinductive flowmeters utilize Faraday's law of induction in that a magnet, usually consisting of two magnetic poles, each with a field coil, generates a magnetic field that contains a magnetic field component perpendicular to the direction of flow in the measuring tube. Within that magnetic field, each volume element of the medium traveling through the magnetic field and containing a particular number of charge carriers contributes the field intensity generated in it to the voltage collected by the measuring electrodes.

In the traditional magnetoinductive flowmeters, the measuring electrodes are so designed as to connect to the flowing medium either through conductive or capacitive coupling. Another particular feature of magnetoinductive flowmeters is the proportionality between the measured voltage and the flow rate of the medium as averaged across the diameter of the measuring tube, i.e. between the measured voltage and the volumetric flow.

In an actual flow-measuring operation, the magnetic field in a magnetoinductive flowmeter is usually reversed in periodically alternating fashion. Prior art has developed a variety of approaches to that effect. For example, magnetoinductive flow measurements can be achieved using an alternating field in which case the field coils of the magnet are typically connected directly to a sinusoidal 50 Hz alternating line-voltage source. However, the voltage generated by the flow between the measuring electrodes is susceptible to distortion by transformational interference voltages as well as line noise potentials.

In more recent times, magnetoinductive flowmeters have generally been designed to work with a switched continuous field. A switched continuous field of that type is produced by feeding the field coils of the magnet a current essentially with a time-based square-wave pattern whereby its polarity is periodically alternated. But equally possible is the use of a pulsating continuous field that is maintained by periodically feeding to the field coils of the magnet a time-based square-wave current of always the same polarity. However, in a preferred method the field current is periodically polarity-reversed, thus producing a periodically alternating magnetic field, because changing the polarity of the magnetic field suppresses interference signals such as electrochemical noise. The voltage between the measuring electrodes, being proportional to the flow rate, is usually quite low, typically in the microvolt range. Measuring that voltage requires high resolution (approx. 100 nV); in the traditional magnetoinductive flowmeters that employ the switched constant-field principle, the measuring frequency is in the 1 to 100 Hz range.

In these earlier magnetoinductive flowmeter designs, the voltage collected at the measuring electrodes is usually fed to a preamplifier before the preamplified voltage signal, being proportional to the flow rate, can be processed further. Widely used preamplifiers are of the differential-amplifier variety which are typically operated with a supply voltage of ±15 V. The dynamic range, meaning the highest possible output voltage of the preamplifier, is thus 15 V, i.e. +15 V for positive signals and −15 V for negative signals. When a preamplifier is operated with a supply voltage of ±15 V, the reference electrode of the magnetoinductive flowmeter is generally held at a potential of 0 volts, i.e. earth potential.

Desirably, however, it should also be possible to operate preamplifiers for magnetoinductive flowmeters at a lower supply voltage, for instance 5 V (0 V, +5 V). Such an amplifier would, in essence, provide a dynamic range of 0 V to 5 V. Appropriate analog components permitting a supply voltage-range from 0 V to 5 V have by now become available, highly precise sigma/delta converters are capable of working with these low input voltages and, most of all, power dissipation is minimized.

SUMMARY OF THE INVENTION

It is the objective of this invention to introduce a magnetoinductive flowmeter and a corresponding measuring method for a magnetoinductive flowmeter by means of which it is possible to effectively operate the latter with a preamplifier that works with such low supply voltages.

For a magnetoinductive flowmeter as described above, this objective is achieved by providing a control circuit element that controls the common-mode input voltage of the preamplifier and/or the potential span of the dynamic range of the preamplifier in such fashion that the said common-mode input voltage of the preamplifier corresponds to approximately half the maximum output voltage of the preamplifier.

When, according to this invention, the common-mode input voltage of the preamplifier is approximately half the output voltage of the preamplifier, it is to minimize the difference between the common-mode input voltage and half the maximum output voltage as much as possible although, to be sure, a complete and especially an instantaneous adjustment will not generally be attainable. As a particular feature, controlling the potential span in the dynamic range of the preamplifier means that the dynamic range, for instance 0 V to 5 V, remains constant at an effective supply voltage of 5 V while undergoing a potential shift covering for instance the range from 1 V to 6 V. At the same time, or as an alternative, it is possible to adjust the common-mode input voltage of the preamplifier so as to again be approximately half the maximum output voltage of the preamplifier.

The control circuit can be designed in different ways. In one preferred implementation of this invention, however, the control circuit element is connected to the reference electrode and serves to control the potential of the reference electrode. Additionally, in an enhanced embodiment of the invention, the control circuit element may be connected to the first measuring electrode and to the second measuring electrode so as to control the potential of the reference electrode as a function of the potentials on the measuring electrodes.

In another preferred embodiment of this invention, the control circuit element encompasses inverter-type differential-amplifier circuitry with a differential amplifier whose inverting input is connected to the first measuring electrode via a first resistor and to the second measuring electrode via a second resistor. In that particular context the non-inverting input of the differential amplifier may be restricted to about half the maximum output voltage of the preamplifier. Accordingly, this would mean that in the case of a preamplifier operating with a supply voltage of 0 V and 5 V, the non-inverting input of the differential amplifier would be held at about 2.5 V.

Specifically, in a control circuit element as described above, the connection to the reference electrode is preferably established via the output of the control circuit. In a further preferred enhancement of the design according to this invention, the inverting input of the differential amplifier connects to the output of the differential amplifier by way of a reverse feedback resistor, possibly with a capacitor connected in parallel. The capacitor serves as a bandwidth delimiter and thus as a control stabilizer.

For a magnetoinductive flowmeter measuring method as described above, the defined objective is achieved by controlling the common-mode input voltage of the preamplifier and/or the potential span of the dynamic range of the preamplifier in such fashion that the said common-mode input voltage of the preamplifier corresponds to approximately half the maximum output voltage of the preamplifier.

Preferred enhancements of the measuring method according to this invention for magnetoinductive flowmeters correspond in analogous fashion to the above-described preferred hardware design enhancements of the magnetoinductive flowmeter according to this invention.

There are numerous ways in which the magnetoinductive flowmeter and the measuring method for a magnetoinductive flowmeter can be configured and expanded. In this context, attention is invited to the claims dependent upon the independent main patent claims and to the detailed description given below of a preferred embodiment of the invention with reference to the attached drawings.

DETAILED DESCRIPTION OF AN
ILLUSTRATIVE EMBODIMENT

Figure 1:
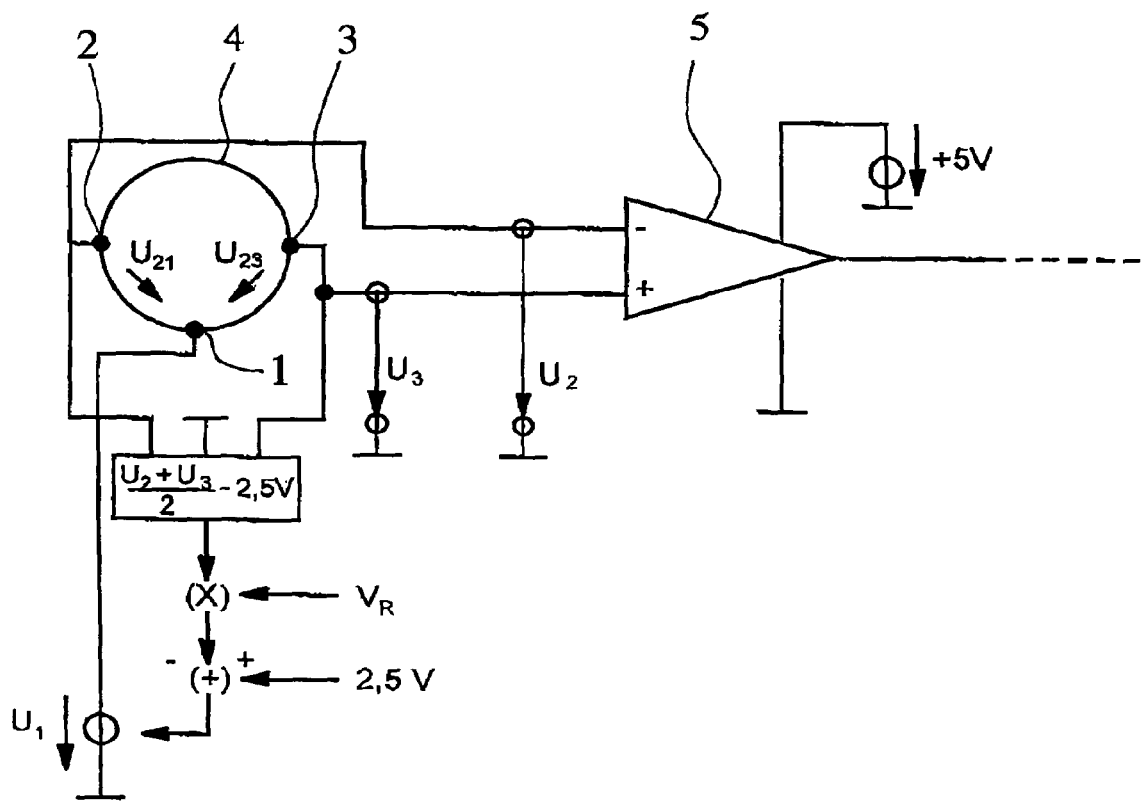
FIG. 1 is a schematic illustration of a magnetoinductive flowmeter according to a preferred embodiment of the invention, showing the control process employed.

The schematic diagram in FIG. 1 shows a preferred embodiment of a magnetoinductive flowmeter that serves to measure the volumetric flow rate of a medium traveling through a measuring tube 4. A magnet, not illustrated, generates a magnetic field that permeates the measuring tube 4 perpendicular to the direction of fluid flow. As an electrically conductive medium flows through the measuring tube 4, a voltage is generated. That voltage can be collected by means of a first measuring electrode 2 and a second measuring electrode 3 both of which are in conductive contact with the flowing medium. The lower section of the measuring electrode 4 is provided with a reference electrode 1 that is itself in conductive contact with the medium. The voltage signal collected at the measuring electrodes 2, 3 is fed to a preamplifier 5 that is designed as a differential amplifier and is operated with a supply voltage of 0 V/5 V.

In contrast to the mode in which conventional magnetoinductive flowmeters are operated, the reference electrode 1 is not maintained at a fixed potential. Instead, as specified in the preferred embodiment of the invention here described, the potential of the reference electrode 1 is adaptively controlled as follows:

The common-mode input voltage of the preamplifier is determined by the mean value of the potentials $U_2$ and $U_3$ that are fed to the inverting and, respectively, non-inverting inputs of the preamplifier. These potentials $U_2$ and $U_3$ are each composed of the sum of the voltages $U_{21}$, $U_{31}$ of a measuring electrode 2, 3 relative to the reference electrode 1 and of the voltage $U_1$ of the reference electrode relative to ground. Hence:

$$U_{21} + U_1 = U_2$$

$$U_{31} + U_1 = U_3$$

$$\frac{U_{21} + U_{31}}{2} + U_1 = \frac{U_2 + U_3}{2}$$

In the preferred embodiment of the invention here described and schematically illustrated in FIG. 1, the potential $U_1$ of the reference electrode 1 is controlled as a function of the potentials $U_{21}$ and $U_{31}$ collected by the measuring electrodes 2, 3, which control feature also includes an amplification by a factor $V_R$ and can be expressed by the following equations:

$$-\left(\frac{U_2 + U_3}{2} - 2.5 \text{ V}\right) \cdot V_R + 2.5 \text{ V} = U_1$$

$$-\left(\frac{U_{21} + U_{31}}{2} + U_1 - 2.5 \text{ V}\right) V_R + 2.5 \text{ V} = U_1$$

-continued $$-\frac{U_{21} + U_{31}}{2}V_R + 2.5\ V(V_R + 1) = U_1 + U_1 V_R$$

$$2.5\ V - \frac{U_{21} + U_{31}}{2} - \frac{V_R}{V_R + 1} = U_1$$

The examples in the following table illustrate the effect of this control on the potential $U_1$ of the reference electrode 1 and thus on the common-mode input voltage $(U_2+U_3)/2$:

| $\frac{U_{21} + U_{31}}{2}$ | $V_R$ | $U_1$ | $\frac{U_2 + U_3}{2}$ |
|---|---|---|---|
| 0 V | any | 2.5 V | 2.5 V |
| 2 V | 2 | 1.17 V | 3.17 V |
| 2 V | 100 | 0.52 V | 2.52 V |
| 2 V | 0 | 2.5 V | 4.5 V |
| −2 V | 2 | 3.83 V | 1.83 V |
| −2 V | 100 | 4.48 V | 2.48 V |
| −2 V | 0 | 2.5 V | 0.5 V |

As indicated further above, the control feature in the preferred embodiment of the invention here described provides for an amplification by a factor of $V_R$. Without any such amplification, meaning a case where $V_R=0$, the situation would be as in the prior art, to wit: for the voltages between the measuring electrodes 2, 3 and the reference electrode 1, i.e. $U_{21}$ and $U_{31}$ combined, $(U_{21}+U_{31})/2=2$ V, an amplification factor of 0 ($V_R=0$) would result in a potential $U_1$ of 2.5 V for the reference electrode 1, putting the common-mode input voltage of the preamplifier at 4.5 V and thus almost completely exhausting the dynamic range of the preamplifier. This applies in analogous fashion to $(U_{21}+U_{31})/2=-2$, resulting in a common-mode input voltage of 0.5 V for the preamplifier 5, which again corresponds to a near-complete exhaustion of the dynamic range of the preamplifier 5.

In contrast to that, an amplification factor of $V_R=100$ yields a substantial improvement, to wit: for $(U_{21}+U_{31})/2=\pm 2$ V, the resulting common-mode input voltage of the preamplifier 5 will be 2.5±0.02 V, leaving the preamplifier essentially with power to spare. One of the reasons for this is that, given an amplification factor of 100, the control feature produces for the reference electrode 1 a potential $U_1$ which, at 0.52 V and 4.48 V, respectively, deviates significantly from the fixed 2.5 V prior-art value.

Indeed, as shown in the above table, a major improvement of the situation is already obtainable with considerably lower amplification factors, insofar as an amplification factor of $V_R=2$ already permits a better utilization of the dynamic range of the preamplifier 5 for differential signals.

Figure 2:
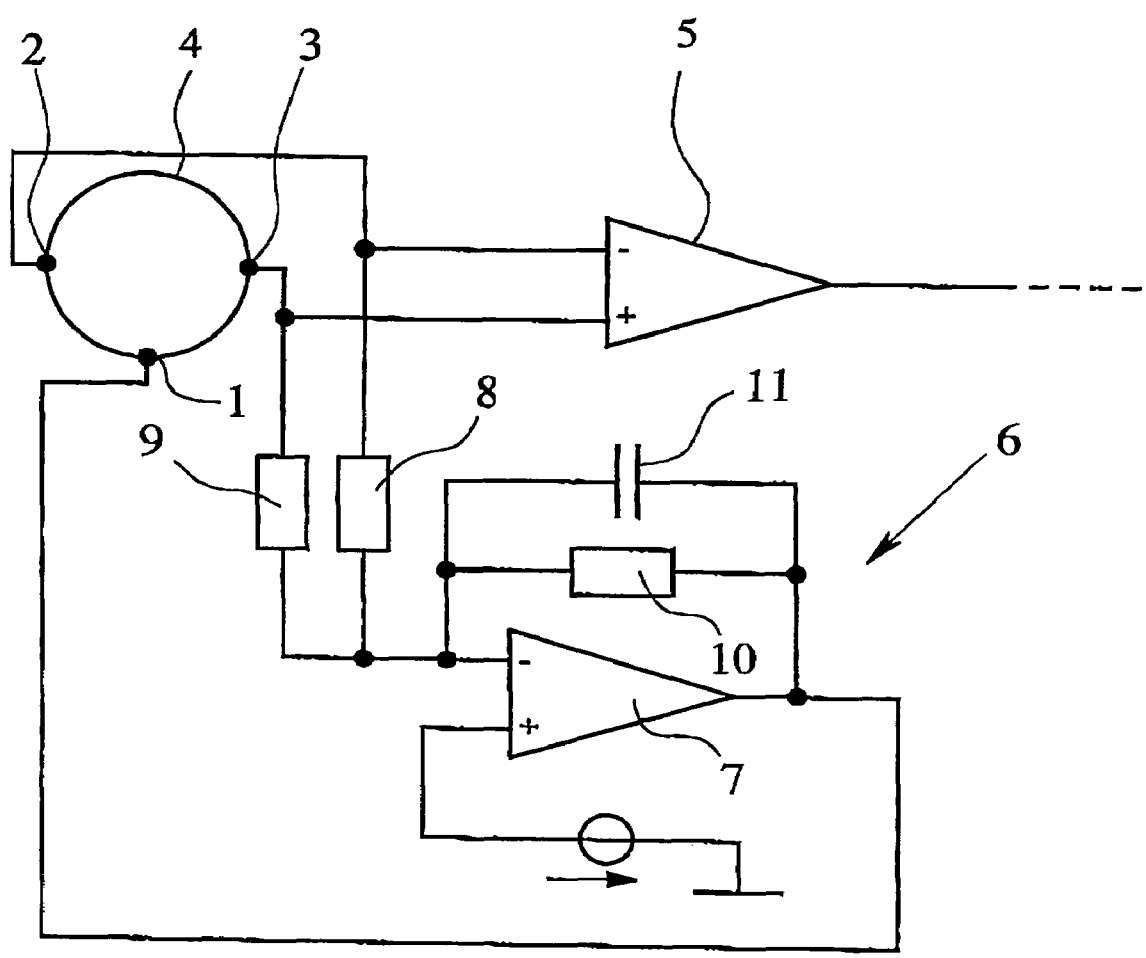
FIG. 2 is a schematic diagram of the magnetoinductive flowmeter according to the preferred embodiment of the invention, including the control circuit element.

FIG. 2 is a schematic diagram illustrating a specific implementation of the control circuit by means of which the above-described control function in the preferred embodiment of the invention can be performed. It shows that the control circuit element connects to the reference electrode 1, the first measuring electrode 2 and the second measuring electrode 3 for controlling the potential of the reference electrode 1 as a function of the potentials on the measuring electrodes 2, 3. To that effect, the control circuit element includes inverting differential amplification circuitry 6 with a differential amplifier 7 whose inverting input is connected to the first measuring electrode 2 via a first resistor 8 and with the second measuring electrode 3 via a second resistor 9. The non-inverting input of the differential amplifier 7 is held at about half the maximum output voltage of the preamplifier 5, i.e. in this case at about 2.5 V, given that the preamplifier 5 is supplied with a voltage of 0 V/5 V. The output of the differential amplifier 7 is finally fed to the reference electrode 1.

The inverting input of the differential amplifier 7 connects to its output by way of a reverse feedback resistor 10. When the first resistor 8, the second resistor 9 and the reverse feedback resistor 10 are quantitatively identical, the resulting amplification factor will be $V_R=2$, which already provides for a better utilization of the dynamic range of the preamplifier 5, as shown in the above table. In addition, a capacitor 11 is connected in parallel with the reverse feedback resistor 10 to delimit the bandwidth and thus to improve the stability of the control feature.

What is claimed is:

1. A magnetoinductive flowmeter for measuring the flow volume of a medium travelings through a measuring tube, with a magnet that serves to generate a magnetic field permeating the measuring tube and including a magnetic-field component that extends perpendicular to the direction of flow, with a first measuring electrode and a second measuring electrode for collecting voltage induced in the medium, a reference electrode that is itself in conductive contact with the medium, as well as a preamplifier to which the potentials collected by the two measuring electrodes are fed, wherein a control circuit element is provided for controlling the common-mode input voltage of the preamplifier and/or the potential span of the dynamic range of the preamplifier in such fashion that said common-mode input voltage of the preamplifier corresponds to approximately half the maximum output voltage of the preamplifier, and wherein the control circuit element is connected to the reference electrode for the purpose of controlling the potential of the reference electrode.

2. The magnetoinductive flowmeter as in claim 1, wherein the control circuit is connected to the first measuring electrode and to the second measuring electrode for the purpose of controlling the potential of the reference electrode as a function of the potentials of the measuring electrodes.

3. The magnetoinductive flowmeter as in claim 2, wherein the control circuit element includes inverting differential amplifier circuitry with a differential amplifier whose inverting input connects to the first measuring electrode via a first resistor and to the second measuring electrode via a second resistor.

4. The magnetoinductive flowmeter as in claim 3, wherein the non-inverting input of the differential amplifier is limited to approximately half the maximum output voltage of the preamplifier.

5. The magnetoinductive flowmeter as in claim 3, wherein the output of the differential amplifier is fed to the reference electrodes.

6. The magnetoinductive flowmeter as in claim 3, wherein a reverse feedback resistor connects the input of the differential amplifier to the output of the differential amplifier and a capacitor is connected in parallel with the reverse feedback resistor.

7. The magnetoinductive flowmeter as in claim 1, wherein the preamplifier is a differential amplifier.

8. A measuring method for a magnetoinductive flowmeter designed to measure the flow volume of a medium traveling through a measuring tube, said magnetoinductive flowmeter incorporating a magnet that serves to generate a magnetic field permeating the measuring tube and including a magnetic-field component that extends perpendicular to the direction of flow, with a first measuring electrode and a second measuring electrode for collecting a voltage potential induced in the medium, a reference electrode that is itself in conductive contact with the medium, as well as a preamplifier to which the potentials collected by the two measuring electrodes are fed, wherein the common-mode input voltage of the amplifier and/or the potential span of the dynamic range of the preamplifier are controlled in such fashion that the common-mode input voltage of the preamplifier corresponds to approximately half the maximum output voltage of the preamplifier and wherein the potential of the reference electrode is controlled as a function of the potentials of the measuring electrodes.

9. The measuring method as in claim 8, wherein the potential of the reference electrode is controlled as a function of the potentials of the measuring electrodes by means of differential amplifier circuitry with a differential amplifier whose inverting input connects to the first measuring electrode via a first resistor and to the second measuring electrode via a second resistor, whose non-inverting input is held at approximately half the maximum output voltage of the preamplifier, whose inverting input is connected to its output by way of a reverse feedback resistor, and whose output is fed the reference electrode.

10. The measuring method as in claim 9, wherein the bandwidth is delimited by means of a capacitor that is connected in parallel with the reverse feedback resistor.

* * * * *